United States Patent Office 2,788,546
Patented Apr. 16, 1957

2,788,546

METHOD OF MOLDING OXYSTARCH

Russell L. Mellies and Ivan A. Wolff, Peoria, Ill., assignors to the United States of America as represented by the Secretary of Agriculture No Drawing. Application August 11, 1954,
Serial No. 449,282

2 Claims. (Cl. 18—55)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to molding articles from oxidized starch, i. e. starch in which free alcohol groups have been oxidized to carbonyl groups, which will be herein referred to as "oxystarch" and has among its objects the preparation from such oxystarch of molded articles possessing a plurality of desirable physical properties.

The oxystarch utilized in this invention is conveniently prepared in accordance with the Dvonch and Mehltretter Patent No. 2,648,629 or the Mehltretter Patent No. 2,713,553. Although these two methods are preferred the specific method for making the oxystarch is not critical insofar as this invention is concerned, provided the oxystarch possesses the required chemical characteristics as disclosed hereinafter in detail.

The preparation of molded articles from starch is known, as is the preparation of molded articles from starch mixed with other resin forming components such as urea-formaldehyde. Nevertheless, prior to this invention, no wholly satisfactory molded starch article has been made.

When granular, non-gelatinized, starch is molded at low moisture content, of say about 10 percent, the powder is merely compacted, and the resulting article is opaque and has little cohesive strength. When the molding is carried out on such starch with moisture contents sufficiently high to enable gelatinization, say 30 to 40 percent, the starch either flows out of the mold or puffs when the pressure is released. Hence, heretofore, it has not been practical to make molded articles from ungelatinized native starch granules.

We have discovered that when starch is oxidized without destruction of its granular form, as by the periodate ion, the resulting oxidation product can be molded easily and under a variety of conditions into almost clear, transparent, articles possessing remarkable hardness and strength. This is believed due to the peculiar effect of this type of oxidation in modifying the gelatinization behavior of the starch. The oxystarch must possess certain percentage oxidation, and the molding must be carried out within certain critical ranges of temperature and moisture content.

The molding temperature lies within the range of 85° C. and 130° C. However, molded articles produced between 85° and 90° tend to be less transparent while those between 120° and 130° tend to be darker in color, and some blistering of the molded article occurs. The ratio of dicarbonyl content to that theoretically possible, expressed as percent, herein referred to as percent oxidation may vary from as little as 5 percent up to 100 percent. However, articles molded from oxystarch of 40 percent or more oxidation are stronger than those molded from oxystarches of 5 to 40 percent oxidation.

Moisture content for the molding step may vary from 20 to 35 percent, with the range of 22 to 32 percent being recommended as advantageous. At moisture content above about 35 percent, water in liquid form is often sequestered from the oxystarch during the molding cycle; hence moisture contents much above this level are not recommended. Below 20 percent moisture content, transparency and strength of the molded items falls off seriously. The molding pressure should be at least 2000 pounds per square inch.

The molded products from oxystarch, when examined microscopically under crossed Nicols, show evidence of orientation or alignment of molecules. The orientation effect has been observed in molded products from oxystarches which have been oxidized to the extent of 40 percent or more, becoming pronounced at about 73 percent.

The strength and degree of transparency of the molded products obtained under comparable conditions of time, temperature, pressure and moisture decreases as the extent of oxidation of the oxystarches falls from 73 percent to 1 percent. At 73 percent oxidation or above, there is little difference, but beginning at 40 percent oxidation, where there is evidence of very little orientation, and continuing down to 1 percent, there is progressive decrease in strength and transparency.

The molded products are fairly resistant to water for a short time at ordinary temperatures. As an example, immersion in water gave an increase in weight of 2.7 percent in 24 hours, without seemingly impairing the strength or transparency. After 6 days, however, the weight increase was about 82 percent. The product was opaque and rubbery, and had increased its size, although retaining its original shape. After removal from the water, the test piece shrank in 24 hours to its original dimensions, and again became hard and semi-transparent, although warped.

In the foregoing discussion, the use of periodate oxidized corn starch has been emphasized. Starches other than corn, as for example wheat starch, potato starch, rice starch, cassava starch and the like and oxidized polysaccharides such as cellulose and dextran may be used. The oxidation method, by which the oxypolysaccharides are produced, does not appear to be critical and the moldable materials may be polysaccharides oxidized by periodate, either chemically or electrolytically or by other oxidizing agents which produce polysaccharides oxidized to a similar type of product.

Conventional plastic additives such as dyes, pigments, plasticizers and fillers, and other resins or resin modifying agents such as urea formaldehyde resins, aldehydes, or other cross-linking agents may be added.

The following experimental data illustrate the invention.

EXPERIMENTAL

The oxystarches used had been prepared by chemical periodate oxidation. A Carver hydraulic press was employed in all the molding operations. The cylindrical test mold contained a well for thermocouple leads, so that temperatures in the mold could be rapidly and accurately determined with a potentiometer. The molded product was obtained in the form of a circular disc about 1⅛ inches in diameter and ⅛ inch in thickness from 1.5–2 g. (dry basis) of the starting material charged into the mold. The mold had first been heated to the temperature desired for molding.

The moisture content of the oxystarches ranged from 14 to 17 percent (Table I) originally. In later stages of the experiments the moisture content was raised artificially by two methods. In the first method a weighed amount of the oxystarch was placed in a screw-cap bottle, and the calculated amount of water needed to bring the moisture content to the level desired was added. The bottle and contents were then allowed to stand in the laboratory 2–3 days, with occasional shaking, before use. Duplicate moisture determinations showed that this method allows uniform distribution of moisture in a relatively short time. In the second method, the oxystarches were placed in glass dishes in desiccators containing water (100 percent relative humidity). A fan blade, mounted on a sharft and inserted in a bearing contained in a rubber stopper in the hole of the desiccator lid was used to keep the air in constant circulation during 10 days. The contents of the dishes were stirred with a spatula on several occasions during this time. At the end of 10 days the humidified samples were transferred to screw-cap bottles and then stored in a desiccator containing water. Results are given in Table I.

The gain in moisture was generally of the order of 13–15 percent during the 10 day period. It was noted that the more highly oxidized starches have a tendency to hold increased amounts of moisture. This is further borne out by the increases in moisture on humidification, except in the case of the "100–R" oxystarch. For some as yet unexplained reason, and even though the sample was humified under the same conditions as the other oxystarches, the moisture content increased only about 4.5 percent.

*Table I.—Humidification of oxystarches*

| Oxystarch [1] Designation | Percentage Oxidation [2] | Percent Moisture at Start | Percent Moisture after Humidification |
|---|---|---|---|
| "1" (0.01) | 2 | 14.14 | 27.10 |
| "5" (0.05) | 6 | 14.33 | 27.40 |
| "10" (.10) | 11 | 14.85 | 27.99 |
| "20" (0.20) | 21 | 15.43 | 29.38 |
| "40" (0.40) | 41 | 15.25 | 30.69 |
| "80" (0.80) | 73 | 15.57 | 31.64 |
| "92" (0.92) | 87 | 17.17 | 31.64 |
| "100-R" (1.00) | 95 | 17.34 | 21.88 |
| "100-O" (1.02) | 91 | 16.01 | 31.14 |

[1] Value in parentheses represents moles periodate consumed during oxidation per mole A. G. U.
[2] Determined by hydroxylamine method.

Data on the molded products and the conditions used for molding are given in Table II, grouped according to the oxystarch used.

When the oxystarches had moisture contents of 14–17 percent and were molded under comparable conditions (7.5 minutes at 6,000 lbs. per sq. inch and a temperature range of approximately 102–106° C.) the opacity and lack of strength (brittleness) of the discs increased as the extent of oxidation decreased. This observation was particularly noticeable in those oxystarches below the "80" oxystarch. For "80," "92," "100-R," and "100-O" oxystarches the transparency and strength (resistance to breakage between the fingers) appeared to be of about the same order. Beginning with the "40" oxystarch, however, a definite progressive weakening and an increase in opacity were noted until the disc from the "1" oxystarch resembled that obtained from ordinary corn starch at the same moisture level, i. e., the disc was a compacted powder. When the moisture content of the various oxystarches had been raised to above 20 percent (Table I), it was found that good transparency, with no opacity at the rim of the disc, was obtained with all the oxystarches, down to the "1" oxystarch. However, the discs did not apear to be as hard when first obtained as at the lower moisture level but became quite hard after 24 hours, probably due to loss of water, although no change in the appearance of the discs was noted.

The discs obtained from oxystarches below "40" oxystarch were not as strong mechanically as those from the more highly oxidized starches. Moreover, such discs from the "10" and "20" oxystarches upon drying in vacuo 60–65° C. for several hours lost 4–6 percent in weight and could then be broken rather easily (not true for discs from the "100-O," "92" and "80" oxystarches). This suggests that hydration may be a factor in conferring strength to the discs. The strength observed in discs obtained from the more highly oxidized starches may be partly due to an orientation which apparently occurs during molding. When such discs (from "80" oxystarch or above) were examined microscopically under crossed Nicols, four areas of partial extinction of the incident light could be noted when the microscope stage was rotated through 360°. This was noted to only a slight extent in a disc from the "40" oxystarch, and not at all in discs obtained from still less highly oxidized starches or from Alderman pea starch or waxy corn starch. Orientation or alignment of the molecules of the oxystarch during molding should make for a more rigid structure. One of the discs from "92" oxystarch was also pulverized, and the powder showed considerable birefringence when viewed under crossed Nicols.

In the following discussion of the molded products from the various oxystarches numbers in parentheses will be used to refer to the various discs. These numbers refer to the corresponding numbers also in parentheses in the section labelled "sample" in Table II.

*"100-O" oxystarch.*—A shorter molding time (2 minutes) (5) gives a product with somewhat less transparency than at 7.5 minutes (4). In both cases and also at a higher pressure (10,000 lbs. per sq. in.) the disc shows opacity at the edge, although slightly less at the higher pressure. When molded at two different moisture levels for 5.5 minutes (16 and 31 percent respectively (1a) and (1)), other conditions being the same, no opacity was noted at the higher moisture content, and the disc appeared to be equally strong. Even when the disc from (1) was heated 38 hours at 60–65° in vacuo it had lost but little strength. At the higher moisture level also a shorter molding time (3 minutes) (2) and/or a lower temperature (84–5° C.) (10) apparently sufficed, although at the lower temperature the disc did not appear to be quite as hard.

*"100-R" oxystarch.*—Although the moisture content of the oxystarch was only about 22 percent (5) no opacity was observed in the disc. At the lower moisture level, however (17 percent; (15)), opacity was noted at the rim, and also when the molding was done at a lower temperature (84–5° C.; (9)), even when the moisture content was at the higher level. It is problematical whether a still higher moisture content might have corrected the result obtained at the lower temperature. At any rate it was shown that a higher moisture content definitely has an effect in reducing the chances for incomplete molding.

"92" oxystarch.—This particular oxystarch was molded at several different moisture levels (0, 10, 17, 23, 29, 32, 38, and 48 percent) under substantially the same conditions (6,000 lbs. per sq. inch; 102–105° C.; 7.5 minutes) (18a, 7a, 10, 7c, 7b, 6, 1, and 3). The marked effect which the level of moisture content has upon the molding ability is clearly defined. At 0 and 10 percent moisture, the results are very poor (discs show considerable opaque area and are easily broken), better at 17 percent (only slight opaque rim on disc), and at 23 percent and above no opacity was noted in the discs, and they were quite resistant to breakage between the fingers. At a moisture content above 32 percent, a "flash-off" of water (and a trace of the oxystarch) occurred.

This oxystarch (17 percent moisture) was also molded at 6,000 lbs. per sq. inch for 7.5 minutes at temperatures ranging from 102 to 130° C. (10, 12, 13, and 14). At the highest temperature range the disc obtained was a darker yellow and appeared to be more brittle, possibly indicating that some decomposition had occurred or that there had been greater loss of moisture. If the higher temperatures are to be used, the molding time could well be shortened as was done with (17) (slightly more color produced than at a lower temperature for a short time (15)), although the moisture content needs to be increased above 17 percent since (16) when molded at 129–130° C. for only 1.5 minutes had considerable opacity at the rim.

At 38 percent moisture the molding time can be reduced from 7.5 to 0.5 minutes (102–4° C.; 6,000 lbs. per sq. in.) without seemingly decreasing the strength of the discs, although the transparency is lessened slightly.

As shown by (7c) and (8) the molding pressure can be decreased from 6,000 to 2,000 lbs. per sq. in. without producing opacity in the disc, the molding time of 7.5 minutes evidently being sufficient to allow the "gelatinization" to take place even at the lower pressure. It is considered that the molding pressure can probably be varied within rather wide limits, although the higher pressures should give a more compact structure in the molded products.

The disc (12) on drying 35 hours at 100° in vacuo had a deeper yellow color but still resisted breakage between the fingers (loss in weight=9.7 percent). After drying an additional 4 hours, however, the disc had become brittle enough to be broken, although additional loss in weight was slight.

The disc (11) was pulverized with some difficulty in a Wiley mill and analyzed for carbonyl content by the hydroxylamine method. The percent carbonyl found was 30.1; the percent carbonyl in the original oxystarch before molding was 30.3.

"80" oxystarch.—The effect of lowering the molding temperature below the usual range of 102–106° C. is well-illustrated with this particular oxystarch. When the moisture content was 16 percent, at a temperature of 82–83° C. over half of the disc was opaque and could be easily broken. At a moisture content of 32 percent (11) and a temperature of 82–85° no opacity was noted, but the disc, while strong, was not as strong as when molded at 102–103° (12) or at 102–106° and the lower moisture content (16 percent; (16)).

A molding time of 1 minute (16 percent moisture) and 105–106° C. was also found to give a disc with considerable opacity and little strength (2). A molding time of 15 minutes (3) did not entirely eliminate the opacity.

A disc molded under the usual conditions from the more highly humidified oxystarch (17) for 4 minutes showed no opacity, nor did the disc suffer any loss in strength after drying 15 hours in vacuo at 60–65° C.

"40" oxystarch.—At this stage of oxidation the difference in molding characteristics of this oxystarch and the more highly oxidized starches became apparent. More opacity was observed in a disc molded under the usual conditions (1), and the disc did not appear as strong. Although the opacity could be eliminated by increasing the moisture content of the oxystarch (13), the strength was not greatly improved. At a lower temperature (84–87° C.; (14)), the opacity was somewhat greater, although the strength was about the same.

"20" oxystarch.—The observations made with the "40" oxystarch apply to an even greater degree to this oxystarch. Even though an increase in moisture content diminished or eliminated the opacity at the rim of the disc, the disc was brittle, especially if the molding time was short (3 min.; (3)). The product obtained after 6 minutes (4) was stronger, but upon partial dehydration at 60–65° C. for several hours in vacuo lost much of its strength. On attempting to raise the molding temperature to 129–130° C. not only did some extrusion from the mold result (18), but darkening and the formation of blisters occurred.

"10" oxystarch.—The disc from this oxystarch (28 percent moisture), while it became quite hard, although with some opacity, on standing 24 hours, was easily disintegrated after drying in vacuo for several hours at 60–65° C.

"5" oxystarch.—The products from this oxystarch were even weaker and showed more opacity than those obtained under comparable conditions from "20" oxystarch. As with other oxystarches the opacity was lessened when "5" oxystarch with a moisture content of 27 percent was used. The strength of the disc is somewhat less than with more highly oxidized starches.

"1" oxystarch.—Even at the higher moisture content (27 percent) the disc from this oxystarch showed considerable opacity, appearing as spots throughout the disc, and, of course, had little strength.

Effect of water upon molded oxystarches.—Tests were made to determine the stability to water of some of the products.

A portion of the disc prepared from "92" oxystarch (4067, 19 (12)) had undergone little apparent change on immersion in distilled water at room temperature for 24 hours, but became opaque and softened after several days. Another portion dissolved to the extent of about 50 percent on heating an hour in water on the steam-bath.

Some pulverized material from another disc ("92" oxystarch; 4067, 18 (11)) was heated in water (0.6 g. in 10 ml. of water) for 2 hours on a steam bath. Over 90 percent of the material dissolved and was recovered from the filtrate by pptn. with several volumes of ethyl alcohol. Analysis for carbonyl by the hydroxylamine method on this recovered product gave 28.2 percent; percent carbonyl in original oxystarch=30.3; in pulverized disc=30.1. Probably some destruction of aldehyde occurred during the heating in water.

A disc prepared from "92" oxystarch (4067, 43 (7c)) increased in weight by 2.7 percent after 24 hours' immersion in water at room temperature. After 6 days' immersion, the disc had become opaque and rubbery, had increased about 20 percent in diameter (also thicker) and had taken up water to the extent of about 82 percent. It was removed from the water and allowed to stand at room temperature for 24 hours. The disc had shrunk to its original diameter, had become hard and semitransparent, and was warped. The weight was about 4 percent less than before immersion (slight dispersion of particles in the water was noted). Orientation was still present.

*Incorporation of coloring materials in molded oxystarches.*—Experiments have shown the feasibility of producing molded discs containing various colors from oxystarches. For example, up to 0.08 percent by weight of a water-soluble pigment (Du Pont Crocein Scarlet N Extra) was mixed with "80" oxystarch (32 percent moisture) before molding at 102–106° C., and 6,000 lbs. per sq. in. for 5.5 minutes. The resultant disc had a brilliant red, glossy appearance, but still retained its transparency and strength. Dispersion of the coloring material was excellent.

*Molded oxycellulose.*—The oxycellulose was prepared by periodate oxidation of finely ground U. S. P. grade absorbent cotton at room temperature, and contained 94.0 percent of dicarbonyl units as indicated by the hydroxylamine method.

The mold was charged with 1.7 grams of oxycellulose (15.8 percent moisture) and subjected to 6000 p. s. i. at 103° to 104° C. for 5.5 minutes. The behavior of the oxycellulose under the conditions was similar to that of oxystarch. The resulting disc was semi-transparent, hard, and appeared to be at least equal in strength to the 100-R oxystarch discs molded under comparable conditions.

*Hardness data.*—Several representative samples of the series of molded discs were tested for their hardness. The specimens were conditioned under ambient laboratory conditions for at least two weeks before testing.

*Table II.—Effect of heat and pressure on oxystarches*

| Sample | Oxystarch [1] Designation | Percent Moisture in Oxystarch | Molding Temp. (°C.) | Molding Pressure (lbs./in.²) | Molding Time (min.) | Remarks |
|---|---|---|---|---|---|---|
| 4067, 21 (4) | 100-O (91) | 16.0 | 103-7 | 6,000 | 7.5 | Slight opacity at edge of disc. |
| 4067, 22 (5) | 100-O (91) | 16.0 | 103-104 | 6,000 | 2 | Less transparency—due to shorter time probably. |
| 4067, 22 (6) | 100-O (91) | 16.0 | 104-5 | 10,000 | 2 | Less opacity at edge—less transparency in center. |
| 4067, 48 (1) | 100-O (91) | 31.1 | 102-4 | 6,000 | 5.5 | No opacity in disc. Strength not apparently decreased on heating in vacuo at ca. 62° C. for 38 hrs. |
| 4067, 48 (1a) | 100-O (91) | 16.0 | 102-4 | 6,000 | 5.5 | Opaque rim on disc—due to lower moisture content. |
| 4067, 48 (2) | 100-O (91) | 31.1 | 102-4 | 6,000 | 3 | No opacity. Shorter molding time sufficient at the higher moisture content. |
| 4067, 50 (10) | 100-O (91) | 31.1 | 84-5 | 6,000 | 3 | No opacity even at lower temp., but disc did not appear to be as hard as 48 (2). |
| 4067, 49 (5) | 100-R (95) | 21.9 | 102-5 | 6,000 | 5.5 | No opacity. Moisture content appears high enough to eliminate opacity. Cf. "92" oxystarch results (23% moisture—4067, 43 (7c)). |
| 4067, 50 (9) | 100-R (95) | 21.9 | 84-5 | 6,000 | 5.5 | Some opacity at edge and side. Temp. too low? |
| 4067, 51 (15) | 100-R (95) | 17.3 | 103-4 | 6,000 | 5.5 | White rim on disc. Moisture too low (cf. 4067, 49 (5)). |
| 4067, 27 (18a) | 92 (87) | 0.0 | 103-5 | 6,000 | 7.5 | No transparency. A compacted powder, easily pulverized. |
| 4067, 43 (7a) | 92 (87) | 10.2 | 102-4 | 6,000 | 7.5 | About one third of disc was transparent. |
| 4067, 18 (10) | 92 (87) | 17.2 | 102-5 | 6,000 | 7.5 | Slight opacity at edge; otherwise hard and transparent. |
| 4067, 43 (7c) | 92 (87) | 23.4 | 102-5 | 6,000 | 7.5 | No opacity. 23% moisture appears adequate. |
| 4067, 43 (7b) | 92 (87) | 29.1 | 102-4 | 6,000 | 7.5 | No opacity. Disc appears "softer" than when molded at lower moisture, but hardens in several hours. |
| 4067, 49 (6) | 92 (87) | 31.6 | 101-2 | 6,000 | 5.5 | One opaque spot near edge. Few bubbles—due to escape of excess moisture? |
| 4067, 105 (1) | 92 (87) | 37.6 | 102-4 | 6,000 | 7.5 | No opacity. Disc very hard. A little powder lost by flashing-off of water at start. |
| 4067, 105 (2) | 92 (87) | 37.6 | 102-4 | 6,000 | 2 | Slightly less transparent but quite hard. |
| 4067, 105 (4) | 92 (87) | 37.6 | 102-3 | 6,000 | 0.5 | Less transparent preceding disc, but hard. |
| 4067, 105 (3) | 92 (87) | 48.2 | 102-4 | 6,000 | 7.5 | Even greater flash-off of water than at 37% moisture. Disc more flexible than 4067, 105 (1) but hardens. |
| 4067, 44 (8) | 92 (87) | 23.4 | 103-6 | 2,000 | 7.5 | Like 4067, 43 (7c), although pressure was reduced two-thirds. |
| 4067, 18 (11) | 92 (87) | 17.2 | 102-7 | 6,000 | 10 | Increase in time apparently had no effect. |
| 4067, 19 (12) | 92 (87) | 17.2 | 110-114 | 6,000 | 7.5 | Disc like 4067, 18 (10). When dried in vacuo ca. 39 hrs. at 100° C., can be broken between fingers. |
| 4067, 19 (13) | 92 (87) | 17.2 | 114-119 | 6,000 | 7.5 | Like 4067, 18 (10). |
| 4067, 19 (14) | 92 (87) | 17.2 | 129-135 | 6,000 | 7.5 | Darker color. Appears more brittle. Temp. too high or time too long. |
| 4067, 19 (15) | 92 (87) | 17.2 | 102-4 | 6,000 | 2.0 | More opaque than 4067, 18 (10), but very hard. |
| 4067, 51 (16) | 92 (87) | 17.2 | 129-130 | 6,000 | 1.5 | Like 4067, 18 (10) but more opacity. Time too short. |
| 4067, 51 (17) | 92 (87) | 31.6 | 129-130 | 6,000 | 1.5 | No opacity, but darker color than 4067, 19 (15). A few bubbles noted—decompn.? |
| 4067, 26 (16) | 80 (73) | 15.6 | 102-6 | 6,000 | 7.5 | Slight opacity at edge. Resembles discs from 92, 100-R, and 100-O oxystarch molded under comparable conditions. |
| 4067, 41 (1) | 80 (73) | 15.6 | 82-3 | 6,000 | 7.5 | Half of disc opaque; easily broken between fingers. |
| 4067, 50 (11) | 80 (73) | 31.6 | 82-5 | 6,000 | 7.5 | No opacity at this higher moisture content. |
| 4067, 50 (12) | 80 (73) | 31.6 | 102-3 | 6,000 | 7.5 | No opacity. Disc appeared stronger than preceding one. |
| 4067, 41 (2) | 80 (73) | 15.6 | 105-6 | 6,000 | 1 | Considerable opacity; disc easily broken. Molding time too short. |
| 4067, 41 (3) | 80 (73) | 15.6 | 102-4 | 6,000 | 15 | Resembles 4067, 26 (16). Trace of opacity not eliminated by the increased molding time. |
| 4067, 94 (17) | 80 (73) | 29.3 | 102-5 | 6,000 | 4 | No opacity. No decrease in strength after 15 hrs. in vacuo at 60-65° C. |
| 4067, 21 (1) | 40 (41) | 15.3 | 102-4 | 6,000 | 7.5 | More opacity than in discs molded under comparable conditions from 80, 92, 100-R, and 100-O oxystarches. Disc appeared less strong. |
| 4067, 51 (13) | 40 (41) | 30.7 | 102-3 | 6,000 | 7.5 | No opacity. Strength of disc about like preceding one. |
| 4067, 51 (14) | 40 (41) | 30.7 | 84-7 | 6,000 | 7.5 | Opacity greater; not much difference in strength. |
| 4067, 26 (17) | 20 (21) | 15.4 | 102-7 | 6,000 | 7.5 | Disc more opaque and brittle than for "40" oxystarch. |
| 4067, 48 (3) | 20 (21) | 27.8 | 102-3 | 6,000 | 3 | No opacity. Disc easily broken—hardens on standing. |
| 4067, 49 (3a) | 20 (21) | 15.4 | 102-3 | 6,000 | 3 | Considerable opacity in disc. Easily broken. |
| 4067, 49 (4) | 20 (21) | 27.8 | 102-5 | 6,000 | 6 | Disc resembles 4067, 48 (3). After drying 15 hrs. in vacuo at 60-65° C., disc easily broken. |
| 4067, 51 (18) | 20 (21) | 27.8 | 129-131 | 6,000 | 2.5 | Slight extrusion. Disc dark yellow, with blisters. No opacity. Temp. too high. |
| 4067, 94 (15) | 10 (11) | 28.0 | 104-5 | 6,000 | 7 | More opacity than in disc from "20" oxystarch. Hardens in 24 hrs. and resists breakage. However, after 6 hrs. at 60-65° C., in vacuo, is easily broken. |
| 4067, 21 (2) | 5 (6) | 14.3 | 102-6 | 6,000 | 7.5 | Opacity increased; fairly brittle. |
| 4067, 49 (7) | 5 (6) | 27.4 | 101-3 | 6,000 | 3 | Only few opaque spots; hardens on standing, but fairly easily broken. |
| 4067, 51 (20) | 5 (6) | 27.4 | 102-3 | 6,000 | 7 | Longer time had little effect. |
| 4067, 49 (7a) | 5 (6) | 14.3 | 102-3 | 6,000 | 3 | Opacity much greater than in 4067, 49 (7). |
| 4067, 50 (8) | 5 (6) | 27.4 | 116-118 | 6,000 | 3 | Deeper color than 4067, 49 (7). Some bubbles—decompn. or escape of moisture? |
| 4067, 21 (3) | 1 (2) | 14.1 | 102-7 | 6,000 | 7.5 | Disc showed only slight transparency. Resembles disc from ordinary cornstarch under comparable conditions. |
| 4067, 51 (20) | 1 (2) | 27.1 | 103-6 | 6,000 | 7 | Better transparency but has many opaque areas. Easily broken. |

[1] Value in parenthesis is percentage oxidation in oxystarch as detd. by hydroxylamine method. The 100-O oxystarch was an over-oxidized product 1.02 moles periodate having been consumed per A. G. U.

Table III

| Sample | Oxystarch[2] Designation | Thickness of specimen (inches) | Rockwell hardness method A, ASTM test D785-51 Av. value | Individual Readings |
|---|---|---|---|---|
| 4067 51 (20) | 5 (6) | 0.076 | Disc shattered | |
| 4067 49 (7) | 5 (6) | 0.076 | Disc shattered | |
| 4067 51 (13) | 40 (41) | 0.072 | M-80 | M-80, M-79, M-81 |
| 4067 94 (17) | 80 (73) | 0.078 | M-103 | M-99, M-105, M-105, M-105 |
| 4067 41 (4)[1] | 80 (73) | 0.094 | M-104 | M-104, M-104, M-106, M-104 |
| 4067 18 (10) | 92 (87) | 0.098 | M-104 | M-103, M-103, M-105, M-99 |
| 4067 43 (7b) | 92 (87) | 0.097 | M-97 | M-95, M-99, M-97, M-97 |
| 4067 21 (4) | 100-O (91) | 0.094 | M-105 | M-104, M-106, M-105, M-106 |
| 4067 49 (5) | 100-R (95) | 0.080 | M-102 | M-99, M-102, M-100, M-105, M-103, M-101 |

[1] Molded under same conditions as 4067 41 (3) in Table II.
[2] Value in parenthesis is percentage oxidation in oxystarch as detd. by hydroxylamine method. The 100-O oxystarch was an over-oxidized product, 1.02 moles periodate having been consumed per A. G. U.

We claim:

1. The method comprising molding oxystarch having a ratio of dicarbonyl content to that theoretically possible of from 5 to 100 percent, at a temperature from 85° to 130° C., at a moisture content from 20 to 35 percent, and at a pressure of at least 2,000 pounds per square inch, to produce a translucent to semi-transparent molded article.

2. The method comprising molding oxystarch having a ratio of dicarbonyl content to that theoretically possible of from 40 to 100 percent, at a temperature from 90° to 120° C., at a moisture content from 22 to 32 percent, and at a pressure of at least 2,000 pounds per square inch, to produce a translucent to semi-transparent molded article.

References Cited in the file of this patent

Kerr: Chemistry and Industry of Starch, 2nd edition, Academic Press, Inc., New York, 1950. Copy in Division 43, pp. 325–342.